United States Patent Office 3,137,698
Patented June 16, 1964

3,137,698
NEW URACIL DERIVATIVES
Rudolf Pfister, Basel, Switzerland, assignor to Geigy Chemical Corporation, Ardsley, N.Y., a corporation of Delaware
No Drawing. Filed June 22, 1962, Ser. No. 204,610
Claims priority, application Switzerland June 23, 1961
6 Claims. (Cl. 260—260)

The present invention concerns new uracil derivatives which have valuable pharmacological properties, as well as processes for the production thereof and compositions containing these new uracil derivatives.

It has surprisingly been found that uracil derivatives of the formula

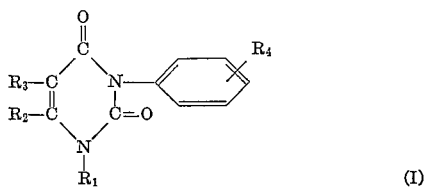

(I)

wherein
$R_1$ represents hydrogen or lower alkyl,
$R_2$ represents hydrogen or lower alkyl,
$R_3$ represents alkyl or alkenyl having from at least 3 to at most 6 carbon atoms or phenyl, and
$R_4$ represents hydrogen, halogen, hydroxyl or lower alkyl or lower alkoxy,
have valuable pharmacological properties, in particular anti-inflammatory, analgesic and antipyretic activity when administered perorally or parenterally. Compounds of the Formula I in which $R_3$ is isopropyl, also cause a great excretion of sodium and chlorine ions without increasing the normal excretion of potassium ions. In addition, compounds of the Formula I, particularly those having a hydrogen as $R_1$, are suitable as intermediate products for the production of other pharmaceutical substances.

The term "lower" in relation with alkyl and alkoxy means radicals having from 1 to 4 carbon atoms, e.g. methyl, ethyl, propyl, isopropyl, butyl etc., methoxy, ethoxy etc.

In the compounds of the Formula I, $R_1$ and $R_2$ are, for example, hydrogen, methyl, ethyl, n-propyl, isopropyl, n-butyl, tert. butyl or isobutyl radicals. $R_3$ represents, e.g. n-propyl, isopropyl, n-butyl, isobutyl, sec. butyl, tert. butyl, n-amyl, isoamyl, tert. amyl, n-hexyl, allyl, methallyl, crotyl and phenyl.

Examples of substituents $R_4$ are fluorine, chlorine or bromine, hydroxyl or methyl, ethyl, n-propyl, isopropyl, tert. butyl, methoxy, ethoxy, n-propoxy, isopropoxy or n-butoxy in the ortho- meta- or, preferably, in the para-position.

More specifically, this invention concerns new uracil derivatives of the following formula

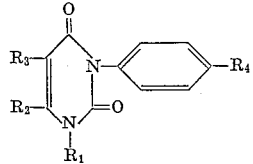

(Ia)

wherein
$R_1$ is hydrogen or lower alkyl, especially hydrogen or methyl,
$R_2$ is hydrogen or methyl, especially methyl,
$R_3$ is n-propyl, isopropyl, n-butyl, isobutyl, sec. butyl, amyl or phenyl, especially isopropyl, and $R_4$ is hydrogen, chlorine, bromine, hydroxy, methoxy or ethoxy, especially hydrogen or chlorine.

The pharmacological activity of compounds of this preferred class of uracil derivatives according to the invention is merely illustrated by the following data: 3-phenyl-5-isopropyl-6-methyl-uracil e.g. shows in a well-known analgesic test [hotplate method, cf. Woolfe and McDonald, J. Pharm, Exper. Therap. 80, 300 (1940)], when administered orally in a dosage of 200 mg./kg., a considerable prolongation of the reaction time of about 97%, and when administered orally in a dosage of 400 mg./kg., said prolongation is about 147%. The toxicity ($DL_{50}$) of the same compound is 4830 mg./kg. (mice p.o.).

Where in the following there is made reference to compounds of Formula I, the preferred compound of the above defined Formula Ia are always included.

To produce the new compounds of Formula I, a compound of the general Formula II

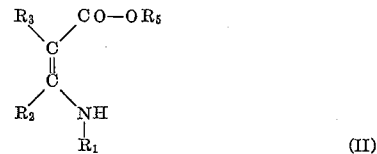

(II)

wherein $R_5$ represents lower alkyl, particularly ethyl, and $R_1$, $R_2$, and $R_3$ have the meanings given above, is reacted in the presence or absence of a tertiary organic base and/or of an inert organic solvent, with a phenyl isocyanate of the formula

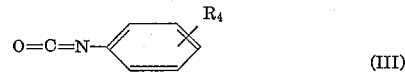

(III)

wherein $R_4$ has the meaning given above, and subsequent ring closure of the so obtained reaction product of the formula

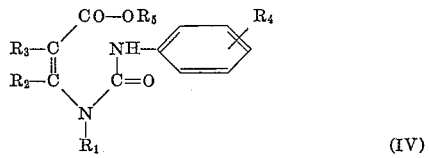

(IV)

by treating it with an alkaline condensing agent and, if desired, by treating a compound of the Formula I in which $R_1$ is hydrogen with a reactive ester of a compound of the formula

$R'_1$—OH (V)

wherein $R'_1$ represents lower alkyl or lower alkenyl, the reaction being performed in the presence of an acid binding agent, in order to introduce a radical $R_1$ which is different from hydrogen.

The reaction of compounds of the Formula II with those of the Formula III is performed, for example, in the presence of pyridine or another tertiary organic base such as triethylamine in an anhydrous inert organic solvent such as, e.g. benzene, toluene, methylene chloride or chloroform, at room temperature or, if necessary, with heating. The ring is closed preferably without previous working up of the intermediate product of Formula IV. If the solvent used in the first step is stable to alkaline condensing agents, it can also be used as reaction medium in the second step.

Ring closure is performed, e.g. by heating the intermediate product of the Formula IV with sodium hydride or with a sodium alcoholate in benzene, toluene or xylene, by heating with an alkali alcoholate in a lower alkanol or, finally, by heating with an aqueous/alcoholic alkali hydroxide solution. The compounds obtained as reaction products of the Formula I in which $R_1$ is hydrogen are soluble in aqueous alkali hydroxide solution with formation of alkali metal salts and they can be precipitated by acidification. They are further purified by recrystallisation from suitable organic solvents.

The introduction of a lower alkyl radical $R_1$ is performed in a simple manner, e.g. by reacting a compound of the Formula I containing a hydrogen atom as $R_1$ with a reactive ester of a lower alkanol or lower alkenol. This reaction is performed in aqueous alkali hydroxide solution or, in the presence of an acid binding agent such as, e.g. potassium carbonate, in a suitable organic solvent such as, e.g. acetone or butanone, if necessary with heating. Suitable reactive esters of lower alkanols or lower alkenols are, e.g. methyl bromide, methyl iodide, ethyl bromide, n-propyl bromide, crotyl bromide, dimethyl sulphate, diethyl sulphate or p-toluene sulphonic acid methyl ester.

Starting materials of the Formula II such as e.g. β-aminocrotonic acid ethyl ester are known and others can be produced by methods known per se, e.g. by reaction of suitable α-substituted α-alkanoyl acetic acid lower alkyl esters with ammonia, lower alkylamines or lower alkenylamines. Numerous starting materials of the Formula III are also known.

Compounds of the Formula I are obtained by a second process by reacting a compound of the formula

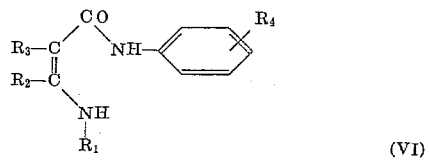

wherein $R_1$, $R_2$, $R_3$ and $R_4$ have the meanings given above, with a carbonic acid derivative of the formula $$Y-CO-OR_5 \qquad (VII)$$

wherein Y represents chlorine, bromine or lower alkoxy and $R_5$ has the meaning given above, treating the reaction product so obtained of the formula

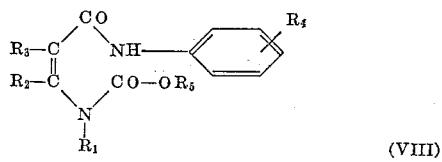

with an alkaline condensing agent to close the ring, and if desired, reacting the compound obtained of the Formula I wherein $R_1$ is hydrogen, in the presence of an acid binding agent, with a reactive ester of a compound of the Formula V given above wherein $R'_1$ has the meaning there given, in order to introduce a radical $R_1$ different from hydrogen.

The first step of the reaction is preferably performed in an inert organic solvent such as, e.g. chloroforrm, benzene or toluene and, if Y is halogen, in the presence of an acid binding agent, e.g. a tertiary organic base such as pyridine or triethylamine, in the cold or, if necessary, with heating. The ring closure in the second step is performed analogously to that described in the first process and, if it is desired to introduce a lower alkyl radical $R_1$, the procedure and the reaction components are the same as those given in the first process.

Starting materials of the Formula VI are obtained, e.g. by reacting acetoacetanilide and acetoacetanilides correspondingly substituted with regard to the meanings of $R_2$, $R_3$ and $R_4$ with ammonia, lower alkylamines or lower alkenylamines. Examples of carbonic acid derivatives of the Formula VII are carbonic acid ethyl ester chloride and methyl ester chloride (chloroformic acid methyl ester and ethyl ester) and also diethyl carbonate.

As has already been mentioned above, compounds of the Formula I in which $R_1$ is hydrogen, form salts most of which are water soluble, with inorganic bases, particularly alkali hydroxides, and also with pharmaceutically acceptable organic bases. Such compounds of the Formula I can thus also be used in the form of aqueous solutions of their alkali metal salts, e.g. for parenteral application.

Pharmaceutical compositions of the compounds of Formula I contain these compounds admixed with pharmaceutically acceptable organic and/or inorganic solid or liquid carriers suitable for enteral or parenteral administration. They are used, for instance, in the form of tablets, dragées, capsules or in liquid form as solutions, drops, suspensions or emulsions. Such compositions and preparations contain at least 0.5% of the active compounds of Formula I. Its percentage in these preparations and compositions, of course, may be varied and may be between about 1% and about 80% of the total weight of a dosage unit. Preferred compositions and preparations are prepared in such a manner that a dosage unit form contains between about 50 mg. and about 500 mg. of the compounds of Formula I.

As excipients for solid compositions, substances which do not react with the active compound can be employed such as, e.g. gelatine, sugar, dextrose, lactose, starches, stearic acid, magnesium or calcium stearate, methyl cellulose, talcum, cholesterol, Aerosil, polyvinylpyrrolidone or any other known carrier for the preparation of solid medicaments. As excipients for liquid preparations, polyvalent alcohols such as, e.g. glycerol, alkylene and polyalkylene glycols such as, e.g. propylene glycol can be used. Water is especially used for the soluble salts of the active compounds, for instance for the preparation of injectable solutions. Such injectable solutions may be sterilised and/or contain auxiliary substances such as preserving agents, stabilising agents, wetting or emulsifying agents, salts for varying the osmotic pressure or buffers. The new compounds can also be incorporated into semi-solid substances as cocoa butter etc. which melt within a suitable range, e.g. 34–36° C. to form suppositories. They may also contain other therapeutically useful substances.

Dosage of the pharmacological preparations of the active compound according to the invention has to be individualised.

The following examples further illustrate the production of the new compounds according to the invention. Parts are given therein as parts by weight and their relationship to parts by volume is as that of grammes to cubic centimetres. The temperatures are in degrees centigrade.

*Example 1*

(a) 55.5 parts of α - n - butyl - β - aminocrotonic acid ethyl ester are dissolved in 270 parts by volume of abs. benzene and 24.2. parts by volume of pyridine are added to the solution. 32.6 parts of phenyl isocyanate are then added dropwise while stirring at 25°. The reaction mixture is then stirred for 30 minutes at the same temperature and afterwards refluxed for 30 minutes.

(b) A solution of 6.9 parts of sodium in 140 parts by volume of abs. ethanol is added at 25° to the solution obtained of the crude α-n-butyl-β-phenylureido-crotonic acid ethyl ester whereupon the main parts of the solvent is distilled off. 270 parts by volume of abs. xylene are added to the residue and the mixture is heated for 2 hours at 130°. After cooling to room temperature, 100 parts of water are added whereupon crystals of 3-phenyl-5-n-butyl-6-methyl-uracil precipitate. The precipitation is completed by acidifying the aqueous solution. After recrystallisation from ethyl acetate, the new compound melts at 195°.

*Example 2*

A solution prepared according to Example 1(a) is first greatly concentrated and the residue together with 500 parts by volume of ethanol and 500 parts by volume of 2 N sodium hydroxide solution is heated for 30 minutes at 90° with vigorous stirring. After distilling off the ethanol, the product is worked up with the addition of water as described in Example 1, whereupon the same compound as described in Example 1 is obtained.

Example 3

60.6 parts of α-isopropyl-β-aminocrotonic acid ethyl ester in 300 parts by volume of benzene and 28.6 parts by volume of pyridine are reacted analogously to Example 1 with 38.7 parts by volume of phenyl isocyanate. 17 parts of a suspension of sodium hydride in mineral oil 1:1 is added at 25° while stirring to the solution obtained of the crude α-isopropyl-β-phenylureidocrotonic acid ethyl ester, whereupon the solution is refluxed for 6 hours. The product is worked up analogously to example 1 beginning with the addition of water. The 3-phenyl-5-isopropyl - 6 - methyl - uracil obtained melts at 250° after recrystallisation from ethanol.

On reacting this compound with the calculated amount of sodium hydroxide or potassium hydroxide, e.g. in aqueous solution, the corresponding sodium or potassium salts is obtained after evaporation of the solvent.

On using 62.5 parts of p-acetoxy-phenylisocyanate, 3-(p-hydroxyphenyl) - 5 - isopropyl - 6 - methyl-uracil is obtained; M.P. >320° (from glacial acetic acid). The acetoxy group is hydrolysed during the working up under the conditions given.

Example 4

24.4 parts of 3 - phenyl - 5 - isopropyl - 6 - methyl-uracil (see Example 3) are dissolved, with heating, in 500 parts by volume of 2 N sodium hydroxide solution. 9.5 parts by volume of dimethyl sulphate are added dropwise at 0–5° and the mixture is stirred for 6 hours at 5°. The crystals which precipitate are filtered off under suction, well washed and recrystallised from 80% methanol. The 1,6-dimethyl - 3 - phenyl - 5 - isopropyl-uracil obtained melts at 125°.

Example 5

10 parts of 3 - phenyl - 5 - isopropyl - 6 - methyl-uracil (see Example 3) are dissolved in 400 parts by volume of warm acetone. 100 parts of anhydrous potassium carbonate and 3.9 parts by volume of ethyl bromide are then added at 25° whereupon the mixture is refluxed for 12 hours. After cooling, the salt mixture is filtered off, the filtrate is concentrated and the residue is recrystallised from dilute ethanol. The 1-ethyl-3-phenyl-5-isopropyl-6-methyl-uracil obtained melts at 138°.

Example 6

19.9 parts of α-n-btuyl-β-methylamino-crotonic acid ethyl ester are mixed with 100 parts by volume of benzene and 8.1 parts by volume of pyridine. 10.9 parts by colume of phenyl isocyanate are added dropwise to the mixture at room temperature whereupon the whole is refluxed for 1 hour. A solution of 2.3 parts of sodium in 50 parts by volume of abs. ethanol is then added at room temperature. The greater part of the solvent is then distillted off, 100 parts by volume of xylene are added to the residue, and the reaction mixture is heated for 3 hours at a bath temperature of 130–140° while distilling off the ethanol liberated. 300 parts by volume of water are added to the cooled reaction mixture, the organic phase is dried, completely concentrated in vacuo and the residue recrystallised from methanol. The 1,6 - dimethyl - 3 - phenyl - 5-n-butyl-uracil so obtained melts at 145°.

Example 7

29.4 parts of α - n - butyl - β - amino - crotonic acid anilide are dissolved in 200 parts by volume of chloroform and 20.2 parts by volume of pyridine. 13.75 parts of chloroformic acid ethyl ester are added dropwise at 20° while stirring and the reaction mixture obtained is left to stand for 12 hours at 20°. It is then washed with dilute hydrochloric acid and sodium carbonate solution and the chloroform solution which remains is dried and evaporated. The syrupy residue is dissolved in 200 parts by volume of xylene and, in the presence of 3.12 parts of sodium hydride, is refluxed for 4 hours. The reaction mixture is worked up, with the addition of water, as described in Example 1 whereupon the compound described in that example is obtained.

The following compounds, for example, are obtained by the methods described in the above examples:

1-n-propyl - 3 - phenyl - 5 - isopropyl - 6 - methyl-uracil, M.P. 124–126°,
1-n-butyl - 3 - phenyl - 5 - isopropyl - 6 - methyl-uracil, M.P. 108°,
1,6 - dimethyl - 3 - phenyl - 5 - isobutyl - uracil, M.P. 183°,
1,6 - dimethyl - 3,5 - diphenyl - uracil, M.P. 122°,
1,6 - dimethyl - 3 - phenyl - 5 - sec.butyl - uracil, M.P. 98°.

The following compounds are also obtained analogously to Examples 1–3 or 6–7:

3-(p-chlorophenyl)-5-isopropyl-6-methyl-uracil, M.P. 219°,
3-(p-bromophenyl)-5-isopropyl-6-methyl-uracil,
3-(p-methylphenyl)-5-isopropyl-6-ethyl-uracil,
3-(p-methoxyphenyl)-5-isopropyl-6-methyl-uracil, M.P. 177°,
3-(p-ethoxyphenyl)-5-isopropyl-6-methyl-uracil,
3-phenyl-5-isopropyl-uracil, M.P. 228°, and
3-phenyl-5-n-propyl-6-methyl-uracil, M.P. 272°.

Example 8

To produce 1000 tablets each containing 200 mg. of active substance of Formula I, the following are used:

(A)

|  | G. |
|---|---|
| Active substance of Formula I | 200.0 |
| Potato starch | 55.0–125.0 |
| Lactose | 55.0–125.0 |
| Aerosil, uncompressed | 15.0–35.0 |

(B)

| Polyvinylpyrrolidone | 15.0–30.0 |
|---|---|
| Glycerine, Ph. Helv. V | 5.0–15.0 |
| Ethanol, q.s. | |

(C)

| Potato starch | 25.0–50.0 |
|---|---|
| Talcum | 25.0–50.0 |
| Magnesium stearate | 1.5–2.5 |

| The total weight must be | 500.0 |
|---|---|

To produce the powder mixture (A), first the uncompressed Aerosil is mixed with the dried potato starch. The active substance is then added, the whole is mixed and then sieved through a sieve (e.g. sieve V, Pharm. Helv. V). Finally the lactose is added and the powder mixture (A) is sieved through a sieve. This powder mixture is then evenly moistened with the granulating solution (B) and the mass is granulated through a sieve (e.g. sieve IV, Pharm. Helv. V). It is dried at about 30° for about 16 hours. The dried granulate is again sieved through a sieve and then carefully mixed with the substances given under (C). The mass so prepared is then compressed into tablets each weighing 500 mg. and containing 200 mg. of active substance.

In a specific example the following portions were used:

(A)

|  | G. |
|---|---|
| 1,6-dimethyl-3-phenyl-5-isopropyl-uracil | 200.0 |
| Potato starch | 133.0 |
| Lactose | 57.0 |
| Aerosil, uncompressed | 18.0 |

(B)

| Polyvinylpyrrolidone | 15.0 |
|---|---|
| Glycerine, Ph. Helv. V | 5.5 |
| Ethanol, q.s. | |

(C)

| | G. |
|---|---|
| Potato starch | 35.0 |
| Talcum | 35.0 |
| Magnesium stearate | 1.5 |
| | 500.0 |

Example 9

To produce 1000 tablets each containing 400 mg. of active substance of Formula I, the following are used:

(A)

| | G. |
|---|---|
| Active susbtance of Formula I | 400.0 |
| Potato starch | 56.0–120.0 |
| Lactose | 56.0–120.0 |
| Aerosil, uncompressed | 24.0–56.0 |

(B)

| | |
|---|---|
| Polyvinylpyrrolidone | 24.0–48.0 |
| Glycerine | 8.0–24.0 |
| Ethanol, q.s. | |

(C)

| | |
|---|---|
| Potato starch | 40.0–80.0 |
| Talcum | 40.0–80.0 |
| Aerosil, uncompressed | 4.0–8.0 |
| Magnesium stearate | 2.4–4.0 |
| The total weight must be | 800.0 |

The process for the preparation is analogous to the process described in Example 8.

In a specific example the following portions were used:

(A)

| | G. |
|---|---|
| 3-phenyl-5-isopropyl-6-methyl-uracil | 400.0 |
| Potato starch | 114.0 |
| Lactose | 76.0 |
| Aerosil, uncompressed | 26.0 |

(B)

| | |
|---|---|
| Polyvinylpyrrolidone | 40.0 |
| Glycerine | 8.0 |
| Ethanol, q.s. | |

(C)

| | |
|---|---|
| Potato starch | 64.0 |
| Talcum | 64.0 |
| Aerosil, uncompressed | 5.0 |
| Magnesium stearate | 3.0 |
| | 800.0 |

Example 10

To produce 1000 dragées each containing 200 mg. of active substances of Formula I the following are used:

(A)

| | G. |
|---|---|
| Active substance | 200.0 |
| Potato starch | 7.5–18.0 |
| Lactose | 7.5–10.0 |

(B)

| | |
|---|---|
| Polyvinylpyrrolidone | 8.4–14.0 |
| Glycerine | 2.8–8.4 |
| Ethanol, q.s. | |

(C)

| | |
|---|---|
| Potato starch | 14.0–22.4 |
| Talcum | 14.0–22.4 |
| Magnesium stearate | 0.8–1.4 |
| The total weight must be | 280.0 |

The components (A) are thoroughly mixed and sieved, then evenly moistened with the granulating solution (B) and granulated. This granulate is dried, again sieved and then carefully mixed with the compounds (C). From this mixture the cores are compressed, each core weighing 280 mg. and containing 200 mg. of the active substance of the Formula I.

The dragées are then finished with coating solution in the usual way. In this manner, dragées having a total (i.e. core and coating) weight of e.g. 385 mg. and containing 200 mg. of active substance of Formula I are obtained.

In a specific example the following portions were used:

(A)

| | G. |
|---|---|
| 1,6-dimethyl-3-phenyl-5-isopropyl-uracil | 200.0 |
| Potato starch | 18.0 |
| Lactose | 9.6 |

(B)

| | |
|---|---|
| Polyvinylpyrrolidone | 11.2 |
| Glycerine | 6.8 |
| Ethanol, q.s. | |

(C)

| | |
|---|---|
| Potato starch | 16.5 |
| Talcum | 16.5 |
| Magnesium stearate | 1.4 |
| | 280.0 |

The cores prepared from these components are finished into drageés with a coating solution from the following ingredients:

| | G. |
|---|---|
| Lacca | 3.00 |
| Gum arabic | 9.00 |
| Dyestuff | 0.03 |
| Talcum | 19.20 |
| Aerosil | 1.50 |
| Sugar | 72.27 |
| | 105.00 |

In Examples 8–10, the following compounds may be used alternatively: corn starch instead of potato starch, gelatine or sodium carboxyethylcellulose instead of polyvinylpyrrolidone, sorbitol 70% instead of glycerine.

What is claimed is:

1. A member selected from the group consisting of a compound of the formula

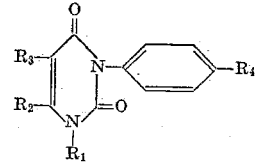

wherein
- $R_1$ is a member selected from the group consisting of hydrogen and lower alkyl,
- $R_2$ is a member selected from the group consisting of hydrogen and methyl,
- $R_3$ is a member selected from the group consisting of n-propyl, isopropyl, n-butyl, isobutyl, sec. butyl, amyl and phenyl, and
- $R_4$ is a member selected from the group consisting of hydrogen, methyl, methoxy, ethoxy, hydroxy, chlorine and bromine.

2. 3-phenyl-5-isopropyl-6-methyl-uracil.
3. 3-phenyl-5-isopropyl-1,6-dimethyl-uracil.
4. 3-(p-chlorophenyl)-5-isopropyl-6-methyl-uracil.
5. 3-phenyl-5-n-butyl-6-methyl-uracil.
6. 3-phenyl-5-isopropyl-1-n-propyl-6-methyl-uracil.

References Cited in the file of this patent

FOREIGN PATENTS 738,581    Great Britain _____ Oct. 19, 1955